United States Patent
Mochizuki

(10) Patent No.: US 6,776,532 B2
(45) Date of Patent: Aug. 17, 2004

(54) ROLLER BEARING WITH A RETAINER HAVING VOIDS FOR CONTAINING GREASE

(75) Inventor: Masanori Mochizuki, Yao (JP)

(73) Assignee: Isel Co., Ltd., Yao (JP)

( * ) Notice: Subject to any disclaimer, the term of this patent is extended or adjusted under 35 U.S.C. 154(b) by 0 days.

(21) Appl. No.: 10/116,819

(22) Filed: Apr. 4, 2002

(65) Prior Publication Data

US 2002/0146186 A1 Oct. 10, 2002

(30) Foreign Application Priority Data

Apr. 10, 2001 (JP) ........................................ 2001-111087

(51) Int. Cl.[7] .............................................. F16C 33/38
(52) U.S. Cl. ......................... 384/572; 384/470; 384/523
(58) Field of Search ........................ 384/572, 576–580, 384/470, 486, 560, 127, 46, 52, 53, 58, 523

(56) References Cited

U.S. PATENT DOCUMENTS

| | | | |
|---|---|---|---|
| 603,869 A | | 5/1898 | Bauer |
| 2,052,292 A | | 8/1936 | Hartmann |
| 2,540,283 A | * | 2/1951 | Parsons ...................... 384/578 |
| 2,677,449 A | * | 5/1954 | Wavak ....................... 192/45.1 |
| 3,305,279 A | | 2/1967 | Zimmerrer |
| 3,387,901 A | * | 6/1968 | Williams .................... 384/576 |
| 3,400,991 A | * | 9/1968 | Haller ........................ 384/578 |
| 3,788,714 A | * | 1/1974 | Degioia et al. ............. 384/482 |
| 3,975,066 A | | 8/1976 | Hofmann et al. |
| 4,907,898 A | * | 3/1990 | Dickinson ................... 384/564 |
| 4,998,346 A | * | 3/1991 | Behrens .................. 29/898.061 |
| 5,069,560 A | * | 12/1991 | Niedermeier et al. ....... 384/486 |
| 5,129,495 A | * | 7/1992 | Johnston et al. .......... 192/48.92 |
| 5,184,899 A | * | 2/1993 | Harimoto .................... 384/560 |
| 5,332,317 A | * | 7/1994 | Niwa et al. ................. 384/548 |
| 5,615,956 A | * | 4/1997 | Oba et al. ................... 384/470 |
| 5,626,426 A | * | 5/1997 | Honda et al. ............... 384/568 |
| 5,647,674 A | * | 7/1997 | Ohashi et al. .............. 384/580 |
| 5,660,485 A | * | 8/1997 | Podhajecki et al. ......... 384/572 |
| 6,006,881 A | * | 12/1999 | Lederman et al. ............ 192/45 |
| 6,102,580 A | * | 8/2000 | Alling et al. ............... 384/618 |
| 6,179,474 B1 | | 1/2001 | Podhajecki |

FOREIGN PATENT DOCUMENTS

| | | |
|---|---|---|
| DE | 2441121 | 3/1976 |
| DE | 2549281 | 5/1977 |
| DE | G9306319 | 7/1993 |
| DE | 19853686 | 5/1999 |
| FR | 1327643 | 5/1963 |

* cited by examiner

Primary Examiner—David A. Bucci
Assistant Examiner—Julie K. Smith
(74) Attorney, Agent, or Firm—W. F. Fasse; W. G. Fasse

(57) ABSTRACT

A needle roller bearing includes a plurality of needle rollers that each have first and second end portions and that are disposed circumferentially around a shaft, a cylindrical first retainer member having a plurality of first notches each respectively adapted to rotatably support the first end portion of a respective one of the rollers, and a cylindrical second retainer member located spaced apart from and opposite the first retainer member and having a plurality of second notches each respectively adapted to rotatably support the second end portion of a respective one of the rollers. A plurality of voids are provided to form grease-containing spaces between the adjacent rollers and between the first and second retainer members so that the roller bearing is sufficiently lubricated.

7 Claims, 5 Drawing Sheets

ROLLER BEARING WITH A RETAINER HAVING VOIDS FOR CONTAINING GREASE

FIELD OF THE INVENTION

The present invention relates to a roller bearing, and more particularly, a roller bearing having a plurality of rollers circumferentially disposed and each rotatably supported by a retainer.

BACKGROUND INFORMATION

Generally, a roller bearing includes a plurality of circumferentially located rollers and a retainer with a plurality of supporting holes adapted to support the rollers rotatably. The retainer typically has an outer race and/or an inner race. As a lubricating method of such a roller bearing, applying grease on the retainer, forming a recess as a grease container on the retainer, or oil drip or splash is conducted.

However, in a roller bearing with smaller rollers, especially, in a needle roller bearing, since a thickness of a retainer is thinner and a distance between adjacent supporting holes of the retainer is narrower, it is difficult to form a recess as a grease container between adjacent supporting holes on a retainer. Particularly, in a needle roller bearing with a smaller outer diameter, since a distance between adjacent supporting holes of the retainer is much narrower, it is very difficult to form a recess as a grease container between adjacent supporting holes on a retainer.

Therefore, a prior art roller bearing, especially with smaller rollers and a smaller outer diameter, could not be fully lubricated.

The present invention has been made to eliminate these problems and its object is to provide a roller bearing having an adequate lubricating function even in the case where the bearing is composed of smaller rollers or the bearing has a smaller outer diameter.

SUMMARY OF THE INVENTION

A roller bearing of the present invention includes N pieces of rollers disposed circumferentially and parallel to each other, and a retainer adapted to support the rollers rotatably. Each roller has a first and second end portion located axially away from each other. The retainer includes a first, generally cylindrical retainer member having N pieces of first notches adapted to rotatably support the first end portion of each roller and a second, generally cylindrical retainer member that is located axially away from and opposite the first retainer member and that has N pieces of second notches adapted to rotatably support the second end portion of each roller. A plurality of voids are provided to form grease containing spaces between the oppositely disposed first and second notches and the circumferentially adjacent, oppositely disposed first and second notches between the first and second retainer members.

According to the present invention, since the retainer is formed of the first and second retainer members contraposed and located away from each other, and voids for grease are formed between circumferentially adjacent notches of these retainer members, even in the case of a needle roller bearing having rollers of smaller diameters and a retainer of a thinner thickness, or a needle roller bearing with a smaller outer diameter and narrower spaces between the adjacent supporting holes, a grease containing space can be secured and thus, adequate lubricating function can be achieved.

Moreover, in this case, because a grease container is not formed concavely on the surface of the retainer but formed at a void where no other members exist between the first and second retainer members, grease can be directly applied to a rolling contact surface between an inner and outer race member and each roller. Thus, the rolling contact surface can be fully and securely lubricated.

When the first and second retainer members are formed separately, N pieces of voids are provided between the first and second retainer members. In this case, since the same number of grease containers as rollers is formed, each roller can be securely lubricated with adequate amount of grease. Also, in this case, not an elongated aperture but a notch is formed in the first and second retainer member to receive each roller. Thus, in injection molding each retainer member, it can be formed using an axially movable mold. Therefore, a multiple mold can be deployed on the same plane in a molding unit of a forming machine, thereby reducing the cost of a mold and manufacturing cost.

To the contrary, in forming a prior art retainer having a plurality of apertures to hold rollers, an inner mold disposed on an inner circumferential side and a plurality of outer molds disposed on an outer circumferential side and divided in a normal direction are required to compose a mold, and each outer mold needs to be translatable in a normal direction. Thus, the structure of a mold becomes complicated and the only one mold can be disposed at a mold unit of a forming machine to secure a travel space of the outer mold, thereby increasing the cost of a mold and a manufacturing cost.

When the first and second retainer members are connected to each other by n (<N) pieces of connections provided at voids and (N-n) pieces of voids are formed between the first and second retainer members, the first and second retainer members can be formed integrally with each other through connections, thus facilitating assembly of a roller bearing. In addition, the first and second retainer members and connections are preferably welded or fused by ultrasonic wave or the like, and alternatively, they may be integrated with each other by plastics molding.

When a cylindrical outer race is further provided and opposite ends of the outer race are supported by the first and second retainer member, the outer race is located on an outer circumferential side of each void formed at adjacent rollers, thereby preventing grease from flying out of the void through centrifugal force. Also, an axial distance between the first and second retainer member can be maintained by the outer race, and the first and second retainer member and the outer race can be integrated with each other, thus facilitating assembly of a roller bearing.

A lip portion of tapered cross section contacting the inner circumference of the outer race may be formed on the first and second retainer member. In this case, by providing such a lip portion, grease which is housed in a void between the first and second retainer members can be prevented from leaking out from the inner circumference of the outer race through a clearance between the opposite ends of the outer race and the first and second retainer members.

An oil groove may be formed at a portion of the first and second retainer member contacting the outer race. Thus, especially in an application where a shaft is fixed and an outer race is rotatable, wear to the retainers due to the difference of the rotational speeds between the retainer and the outer race can be prevented.

BRIEF DESCRIPTION OF THE DRAWINGS

For a more complete understanding of the invention, reference should be made to the embodiments illustrated in greater detail in the accompanying drawings and described below by way of examples of the invention. In the drawings, which are not to scale.

DETAILED DESCRIPTION OF THE PREFERRED EMBODIMENTS

Figure 1:
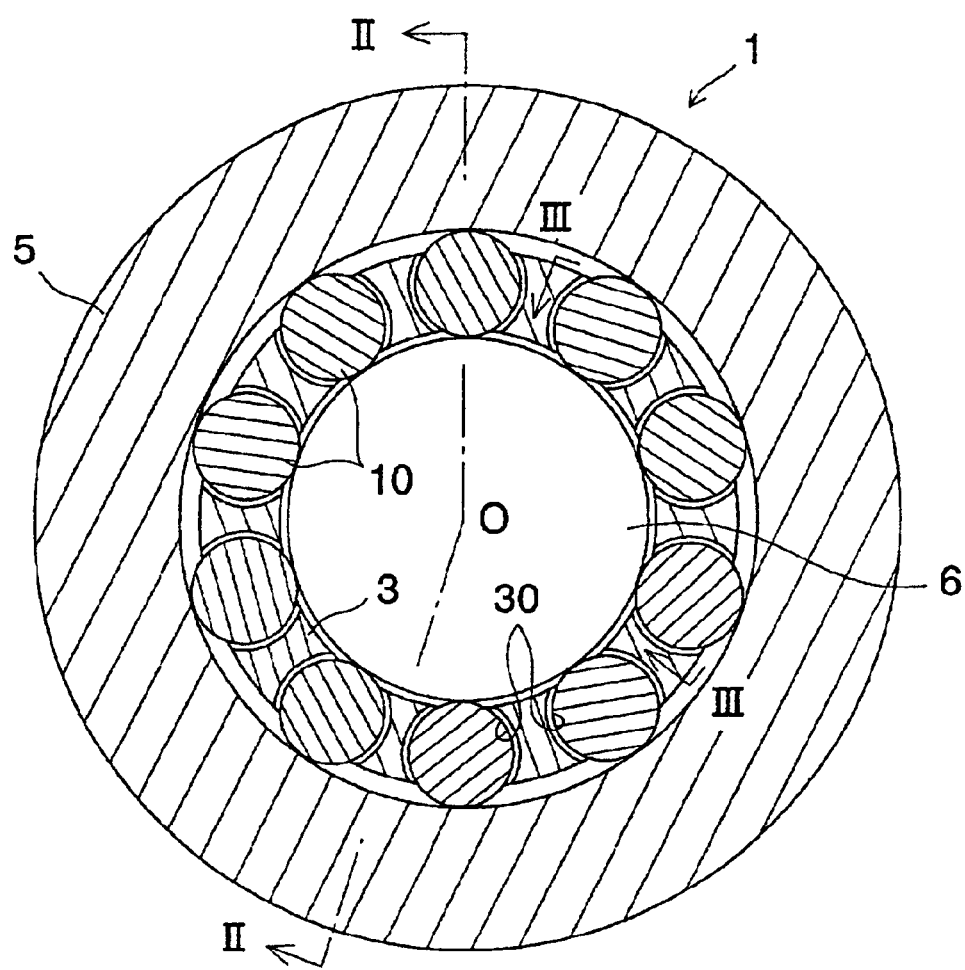
FIG. 1 is a cross sectional view of a needle roller bearing according to an embodiment of the present invention, showing a cross section of FIG. 2 taken along line I—I.
Figure 2:
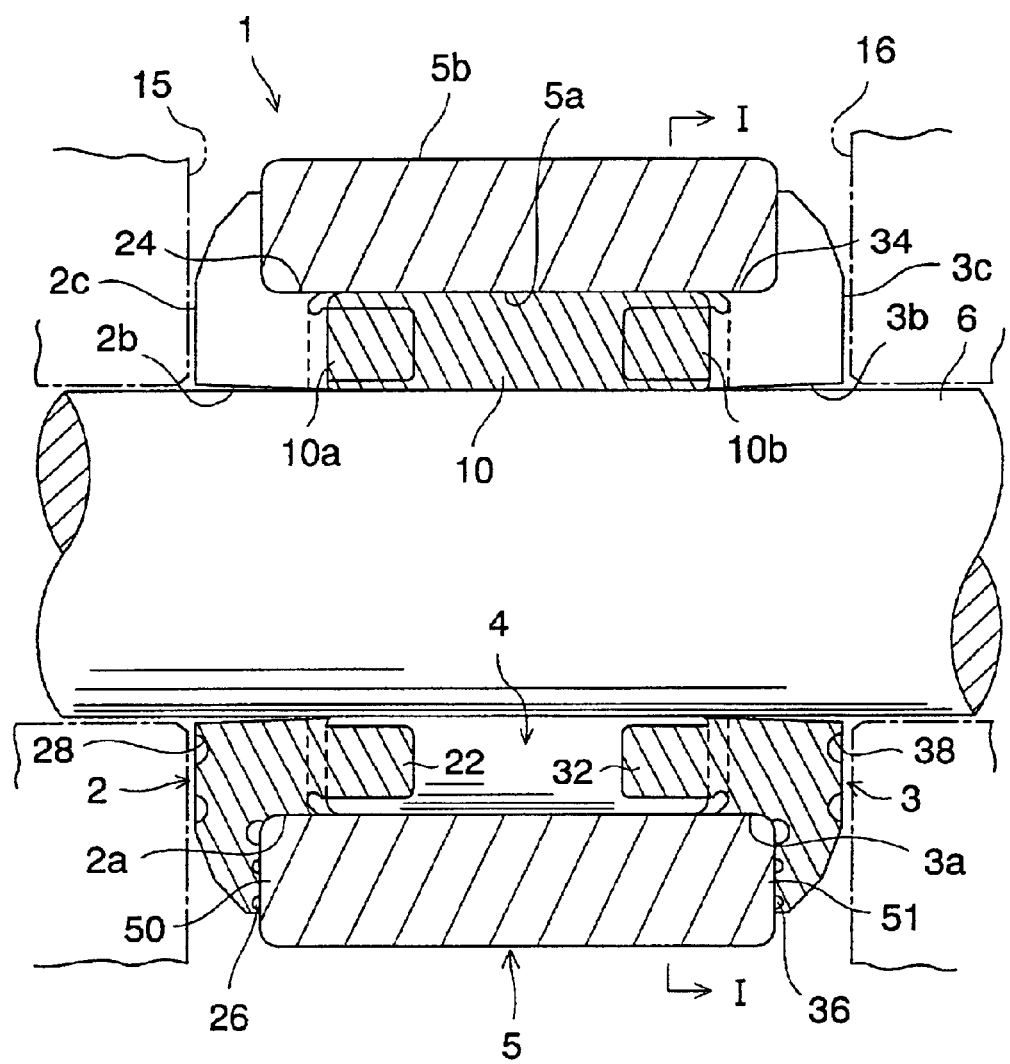
FIG. 2 is a longitudinal sectional view of FIG. 1 taken along line II—II.

Referring now to the drawings, FIGS. 1 and 2 show a needle bearing according to an embodiment of the present invention. FIG. 1 is a cross sectional view of FIG. 2 taken along line I—I and FIG. 2 is a longitudinal sectional view of FIG. 1 taken along line II—II.

As shown in FIGS. 1 and 2, a needle roller bearing 1 includes a plurality of needle-shaped rollers 10 disposed along a circumference and parallel to each other, and a first and second retainer member 2, 3 having a generally cylindrical shape and located axially away from and opposite each other.

Figure 3:
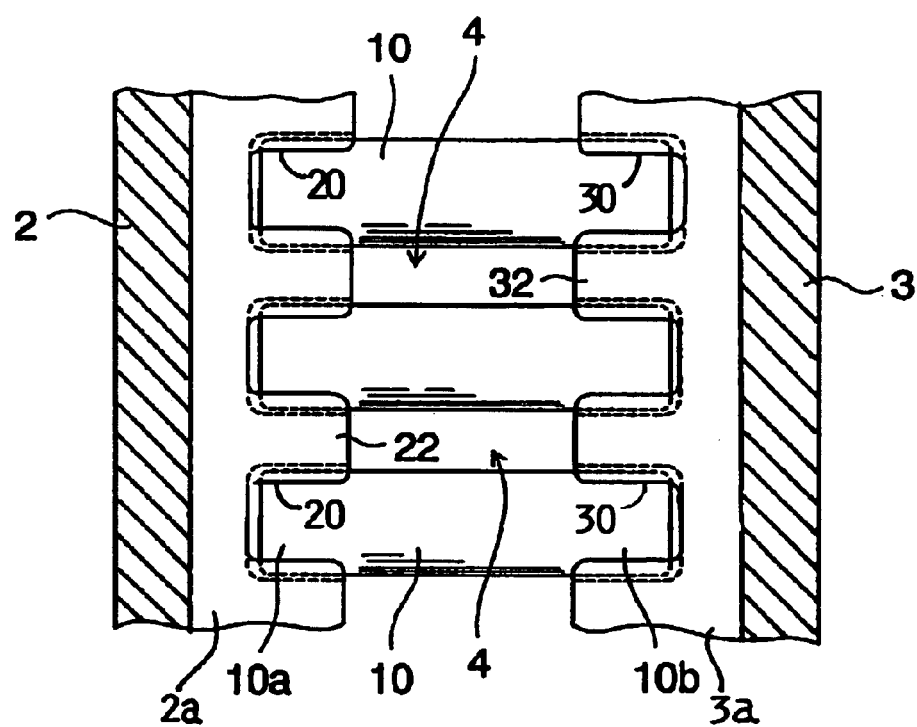
FIG. 3 is a side view of a portion of a needle roller bearing of the present invention, as viewed from line III—III of FIG. 1.

FIG. 3 is a side view of a portion of the needle roller bearing 1. The first retainer member 2 has a plurality of first notches 20 each rotatably supporting an end portion 10a of the roller 10. Similarly, the second retainer member 3 has a plurality of second notches 30 each rotatably supporting the other end portion 10b of the roller 10. These notches 20, 30 are disposed opposite each other.

There is provided a void 4 that forms a grease-containing portion between adjacent rollers 10. In other words, a protrusion 22 is formed between adjacent notches 20 of the first retainer member 2, and similarly, a protrusion 32 is formed between adjacent notches 30 of the second retainer member 3. The void 4 is formed between these protrusions 22 and 32 oppositely disposed in an axial direction. The number of the voids 4 is the same as that of each of the notches 20, 30.

Turning back to FIGS. 1 and 2, a cylindrical outer race 5 is provided between the first and second retainer members 2, 3. The first and second retainer members 2, 3 are respectively formed with bosses 2a, 3a each supporting an end portion 50, 51 of the outer race 5. Lip portions 24, 34 each having a tapered cross section and contacting an inner circumferential surface 5a of the outer race 5 are formed at the bosses 2a, 3a. Also, the outer circumferential surface 5b or cylindrical surface of the outer race 5 is formed straight. That is, a generating line of the cylindrical surface 5b is straight.

The first and second retainer members 2, 3 respectively have central holes 2b, 3b into which a shaft 6 is inserted. An oil or grease retaining groove 26 is formed on a side surface of the first retainer member 2 that extends perpendicularly relative to the central axis of the first retainer member 2, faces axially inwardly toward the second retainer member 3, and axially supports a first end surface of the outer race 5. Also, an oil or grease retaining groove 28 is formed on an end surface 2c of the first retainer member 2. Similarly, an oil or grease retaining groove 36 is formed on a side surface of the second retainer member 3 that extends perpendicularly relative to the central axis of the second retainer member 3, faces axially inwardly toward the first retainer member 2, and axially supports a second end surface of the outer race 5. Also, an oil or grease retaining groove 38 is formed on an end surface 3c of the second retainer member 3.

Additionally, side walls 15, 16 are respectively provided beside the first and second retainer members 2, 3. These side walls 15, 16 restrain axial movements of the first and second retainer members 2, 3, thereby preventing the needle roller bearing 1 from falling off the shaft 6.

In this case, as above-mentioned, since a retainer is formed of the oppositely disposed, first and second retainer members 2, 3 and a plurality of voids 4 are formed between the adjacent rollers 10 to provide grease containers, especially in the case of a needle roller bearing with a thinner retainer, or with a very narrow space between the adjacent needle rollers and a smaller outer diameter, a grease reservoir or container can be securely formed, and thus, an adequate lubricating function can be achieved.

Also, because a grease container is formed not on the surface of the retainer but in the voids 4 where no other members exist between the retainer members 2 and 3, more grease can be directly applied on a rolling contact surface between the shaft 6 and each needle 10, thereby lubricating the rolling contact surface more adequately and securely.

Moreover, in this case, since the same number of voids 4 or grease containers as that of the rollers 10 is formed between the first and second retainer members 2, 3, an adequate amount of grease is maintained to lubricate each needle roller 10.

Furthermore, in operation, the outer race 5 positioned outside the voids 4 prevents grease in each void 4 from flying out of the void 4 through centrifugal force. Also, the first and second retainer members 2, 3 are integrated with each other through the outer race 5, thus facilitating assembly of the needle roller bearing. Additionally, since the outer race 5 has a straight cylindrical face, working process of the outer race 5 becomes easier.

Also, leakage of grease in the void 4 to the outside of the roller bearing 1 through a clearance between the bosses 2a, 3a of the retainer members 2, 3 and the inner circumference 5a of the outer race 5 is prevented by lip portions 24, 34 of the first and second retainer members 2, 3.

Moreover, in this case, not holes but notches 20, 30 are provided to receive needle rollers 10 in the first and second retainer members 2, 3. Thus, in injection molding each retainer member 2, 3, it can be formed using an axially movable mold. Therefore, a multiple mold can be deployed on the same plane in a molding unit of a forming machine, thereby reducing manufacturing cost.

In contrast, when forming a retainer of prior art with a plurality of apertures to receive the whole lengths of rollers, an inner mold disposed on an inner circumferential side and a plurality of outer molds disposed on an outer circumferential side and divided in a normal direction are required to compose a mold, and each outer mold needs to be translatable in a normal direction. Thus, the structure of a mold becomes complicated and the only one mold can be disposed at a mold unit of a forming machine to secure a travel space of the outer mold, thereby increasing manufacturing cost.

Also, especially in an application where a shaft 6 is fixed and the outer race 5 is rotatable, oil grooves 26, 36 formed on the side faces of the retainer members 2, 3 prevent wear to the side faces of the retainer members 2, 3 due to the difference of the rotational speed between the retainer members 2, 3 and the outer race 5. Similarly, oil grooves 28, 38 formed on the end faces 2c, 3c of the retainer members 2, 3 prevent wear to the end faces 2c, 3c.

In the above-mentioned embodiment, the first and second retainer members 2, 3 are completely separated and located away from each other, but the application of the present invention is not limited to this embodiment. The present invention also applies to another embodiment shown in FIG. 4.

Figure 4:
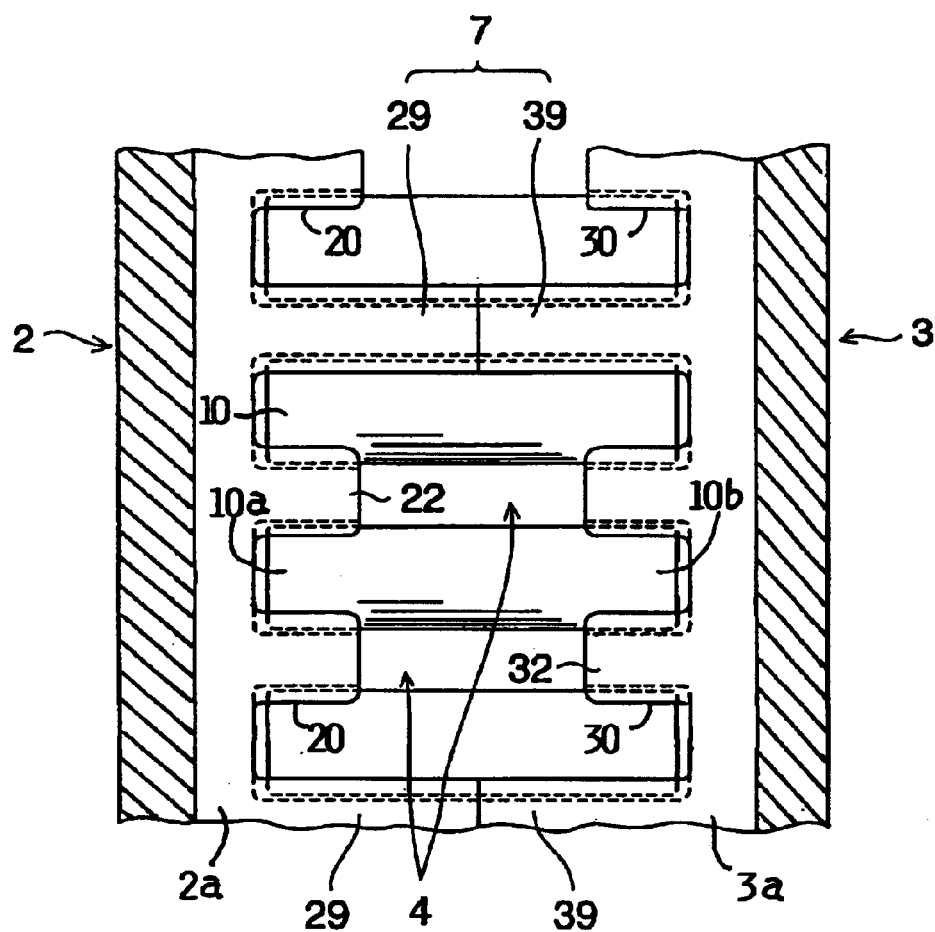
FIG. 4 is a side view of a portion of a needle roller bearing according to another embodiment of the present invention.

In FIG. 4, the same reference numerals indicate the same or corresponding portions of FIG. 3. As shown in FIG. 4, the first retainer member 2 is partly connected to the second retainer member 3. That is, between the first and second retainer members 2, 3, voids 4 and connections 7 to connect the corresponding projections 22, 32 coexist.

Here, when the number of needles 10 is N and the number of connections 7 is n (n is smaller than N), the number of voids 4 is (N−n). In this case, the first and second retainer members 2, 3 can be integrated with each other through connections 7, thereby facilitating assembly of a needle roller bearing.

A connection 7 is preferably formed by fusing or welding a connecting portion 29 of the first retainer member 2 to a corresponding connecting portion 39 of the second retainer member 3 through supersonic wave or the like. Alternatively, these connections 29, 39 may be formed integrally with each other through plastics molding.

Figure 5:
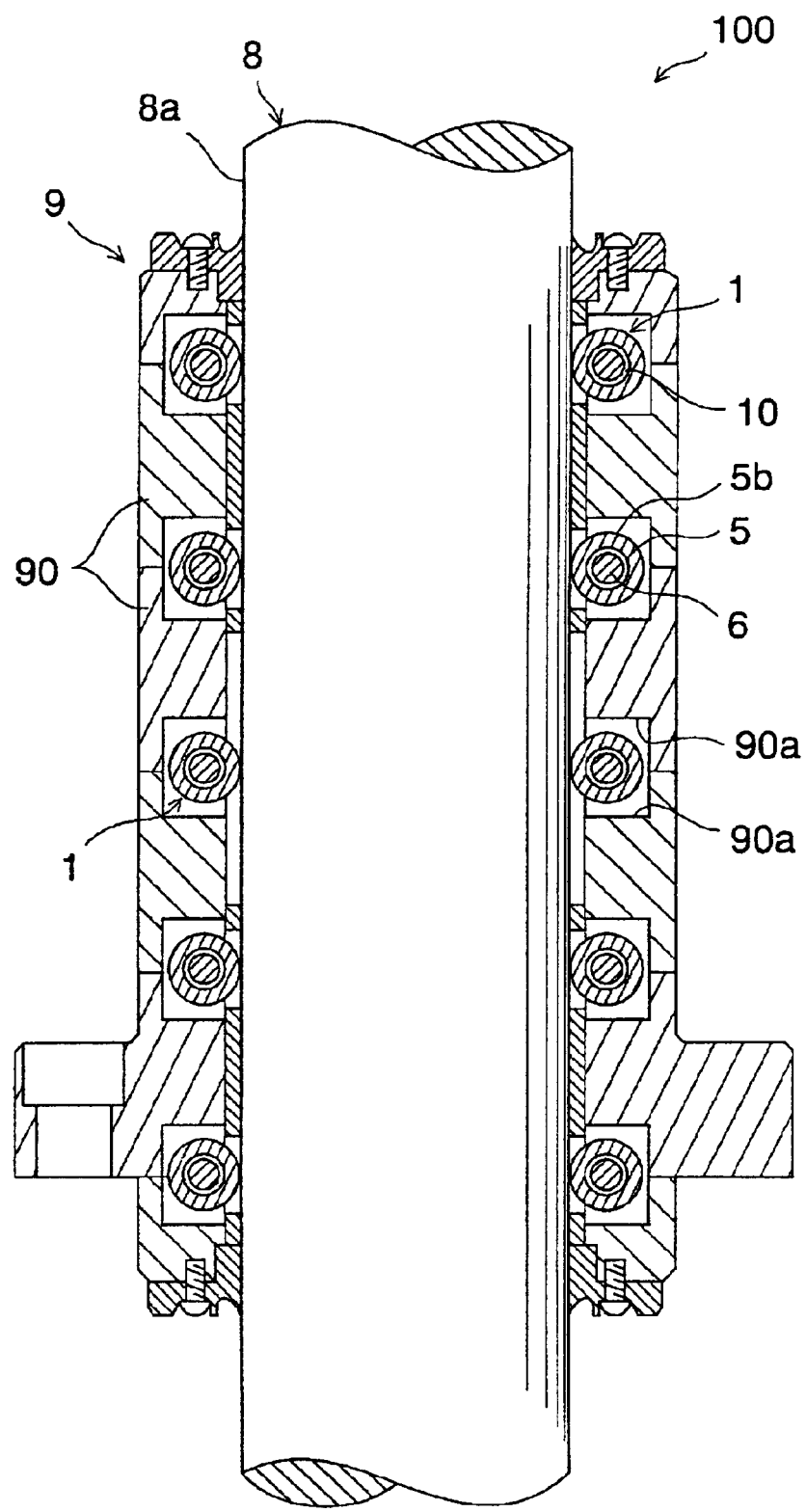
FIG. 5 is a sectional view of a column guide employing a needle roller bearing of FIG. 1.

Next, FIG. 5 shows a column guide employing the needle roller bearing 1 of the present invention. As shown in FIG. 5, a column guide 100 includes an axially extending ram 8 of a solid cylindrical shape and a column 9 of a hollow cylindrical shape that receives the ram 8 and that is axially translatable relative to the ram 8.

The column 9 is composed of a plurality of ring-shaped members 90 that are stacked axially and fixed to each other in a known manner such as bolts. On contact faces of the adjacent ring-shaped members 90, a plurality of recesses 90a disposed around the ram 8 are formed. The above-mentioned needle roller bearing 1 is housed in a space formed by the oppositely disposed recesses 90a of the adjacent ring-shaped members 90. In FIG. 5, the needle roller bearing 1 is shown in a simplified manner.

Each shaft 6 of the needle roller bearing 1 extends in a direction perpendicular to the axis of the ram 8 and is supported by the ring-shaped member 90. The outer circumferential surface 5b of the outer race 5 is in contact with the outer circumferential surface 8a of the ram 8. Thus, by rotation of the outer race 5 around the shaft 6 and axial rolling movement of the outer race 5 on the outer circumferential surface 8a of the ram 8, the column 9 is axially translatable relative to the ram 8.

In an application to such a column guide, the outer race 5 of the needle roller bearing 1 may have a cylindrical surface 5b of a concavely curved generating line. When the outer circumferential surface 8a of the ram 8 is formed by a convexly curved surface with a smaller radius of curvature than a cylindrical surface 5b of the outer race 8, a contact area between the cylindrical surface 5b of the outer race 5 and the outer circumferential surface 8a of the ram 8 increases and surface pressure on the contact surface can be decreased, thereby improving wear resistance. To the contrary, when the outer race 5 has a cylindrical surface 5b of a convexly curved generating line and the outer circumferential surface 8a of the ram 8 is formed by a concavely curved surface with a greater radius of curvature than a cylindrical surface 5b of the outer race 5, a contact area between the cylindrical surface 5b of the outer race 5 and the outer circumferential surface 8a of the ram 8 increases and surface pressure on the contact surface can be decreased, thereby improving wear resistance.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. A needle roller bearing comprising:
    a plurality of cylindrical needle rollers disposed circumferentially and parallel to each other about a central axis of said roller bearing, each of said rollers having a first end portion and a second end portion located axially away from each other;
    a retainer that rotatably supports said rollers, said retainer comprising:
        a cylindrical first retainer member having a plurality of first notches circumferentially alternately between first protrusions, said first notches respectively individually rotatably supporting said first end portions of said rollers, said first retainer member further having a first boss with a first side face that extends perpendicularly to said central axis of said roller bearing; and
        a cylindrical second retainer member located axially away from and opposite said first retainer member, said second retainer member having a plurality of second notches circumferentially alternately between second protrusions, said second notches respectively individually rotatably supporting said second end portions of said rollers, said second retainer member further having a second boss with a second side face that extends perpendicularly to said central axis of said roller bearing, said first and second side faces of said first and second bosses facing axially inwardly toward one another;
        wherein a plurality of voids are provided to form grease-containing spaces axially between oppositely disposed pairs of said first and second protrusions of said first and second retainer members, and circumferentially between circumferentially adjacent pairs of said rollers; and
    an outer race having a cylindrical shape, opposite ends of said outer race being supported by said first and second retainer members, with end surfaces of said opposite ends of said outer race respectively supported against said first side face of said first boss of said first retainer member and said second side face of said second boss of said second retainer member.

2. The roller bearing according to claim 1, wherein said first and second retainer members are formed separately, said first and second retainer members each having the same number of said voids as said rollers.

3. The roller bearing according to claim 1, wherein said retainer members further comprise a plurality of integrally protruding connection members by which said first and second retainer members are axially connected to each other, the number n of said connection members being smaller than the number N of said rollers, and the number of said voids formed between said first and second retainer members being given by N-n.

4. The roller bearing according to claim 1, wherein each of said first and second retainer members further comprises an axially extending lip portion of a tapered cross-section which contacts and extends along an inner circumferential surface of said outer race.

5. The roller bearing according to claim 1, wherein said first and second retainer members respectively have an oil- or grease-retaining groove formed in said first and second side faces of said first and second bosses contacting with said end surfaces of said outer race.

6. The roller bearing according to claim 1, wherein said first protrusions of said first retainer member and said second protrusions of said second retainer member extend axially in alignment with one another and axially toward one another without axially reaching or overlapping one another, to leave said voids respectively axially therebetween.

7. The roller bearing according to claim 1, wherein said first and second notches respectively have a shape of a partial-cylindrical recess extending axially parallel to said central axis so as to receive and rotatably retain respective ones of said end portions of said rollers therein.

* * * * *